US007316335B2

(12) United States Patent
Colburn et al.

(10) Patent No.: US 7,316,335 B2
(45) Date of Patent: Jan. 8, 2008

(54) MATERIAL DISPENSER HAVING A POSITIVE SHUTOFF MECHANISM

(75) Inventors: William S. Colburn, San Diego, CA (US); Timothy Strecker, Corvallis, OR (US); Gerald Vincent Rapp, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 405 days.

(21) Appl. No.: 10/754,404

(22) Filed: Jan. 8, 2004

(65) Prior Publication Data

US 2005/0150914 A1 Jul. 14, 2005

(51) Int. Cl.
*G01F 11/20* (2006.01)

(52) U.S. Cl. ...................................... 222/413; 222/489

(58) Field of Classification Search ................ 222/413, 222/412, 460–462, 489, 240, 241, 505–509
See application file for complete search history.

(56) References Cited

U.S. PATENT DOCUMENTS

| | | | | |
|---|---|---|---|---|
| 4,310,251 | A * | 1/1982 | Scharer et al. | 366/77 |
| 4,486,102 | A * | 12/1984 | Thiele et al. | 366/182.1 |
| 5,046,666 | A | 9/1991 | Ono | |
| 5,085,352 | A | 2/1992 | Sasaki et al. | |
| 5,427,062 | A * | 6/1995 | Chamot et al. | 123/41.1 |
| 5,698,014 | A * | 12/1997 | Cadle et al. | 96/157 |
| 5,876,116 | A * | 3/1999 | Barker et al. | 366/182.3 |
| 5,918,775 | A | 7/1999 | Arcese et al. | |
| 5,931,355 | A | 8/1999 | Jefferson | |
| 6,138,925 | A * | 10/2000 | Anthony | 239/224 |
| 6,386,396 | B1 | 5/2002 | Strecker | |
| 6,598,765 | B2 | 7/2003 | Pagel et al. | |
| 6,739,483 | B2 * | 5/2004 | White et al. | 222/413 |

* cited by examiner

*Primary Examiner*—Lien M. Ngo

(57) ABSTRACT

A replaceable auger assembly includes a body having at least one material inlet defined therein and an auger disposed within the body. The auger includes a helical portion disposed about a shaft portion and a positive shutoff mechanism. The positive shutoff mechanism is configured to selectively close the material inlet.

24 Claims, 8 Drawing Sheets

MATERIAL DISPENSER HAVING A POSITIVE SHUTOFF MECHANISM

BACKGROUND

Adhesive dispenser systems are used in several applications, including the deposition of structural adhesives onto parts, such as print cartridges. Current adhesive dispenser systems that use an auger to move the adhesive rely on adhesive material supply pressure cycling (on/off) and auger rotation to control the flow of adhesive material. However, compressibility of the adhesive in the supply system and the auger result in undesirable pressure transients in the supply system during pressure cycling. The auger and the supply system are open with respect to each other.

To control the dispensing, the supply system is often cycled between high and low pressure. The low pressure may be established to prevent the adhesive from leaking from the dispense tip, while the higher pressure is applied to direct the adhesive into the auger. The pressure cycling may result in the unintended leakage or drooling of material through the auger during dispensing processes. For example, during periods of low pressure some material can accumulate on the end of the dispense tip. When the pressure is then increased, the accumulated adhesive may result in an excess of material being deposited during the dispensing processes.

Other approaches are further used to minimize the amount of material that leaks or drools from the auger body when the auger is idle. For example, highly viscous material is used in combination with multiple flutes on the auger. These approaches only work with highly viscous materials in combination with auger assemblies having components with large coefficients of friction.

Still other systems have been developed that make use of needle valve, pinch valves, or other gate valves on the end of the auger assembly. Such methods add complexity, expense and/or the need for frequent cleaning or flushing of the valve parts. For example, when the auger assembly is replaced, the valves must be removed and cleaned. Once the auger assembly has been replaced, the valves are again coupled to the auger assembly. The cleaning and separate coupling operations increase maintenance costs.

Recently, systems have been developed that use displacement metering pumps to supply material to the auger. These displacement metering pumps may also be used as valves for the auger, in that they control the flow of the dispensed materials. These systems also add complexity and/or the need for frequent cleaning of the metering parts.

SUMMARY

A replaceable auger assembly includes a body having at least one material inlet defined therein and an auger disposed within the body. The auger includes a helical portion disposed about a shaft portion and a positive shutoff mechanism. The positive shutoff mechanism is configured to selectively close the material inlet.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A replaceable auger assembly includes a body having at least one material inlet defined therein and an auger disposed within the body. The auger includes a helical portion disposed about a shaft and a positive shutoff mechanism. The positive shutoff mechanism is configured to selectively close the material inlet.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
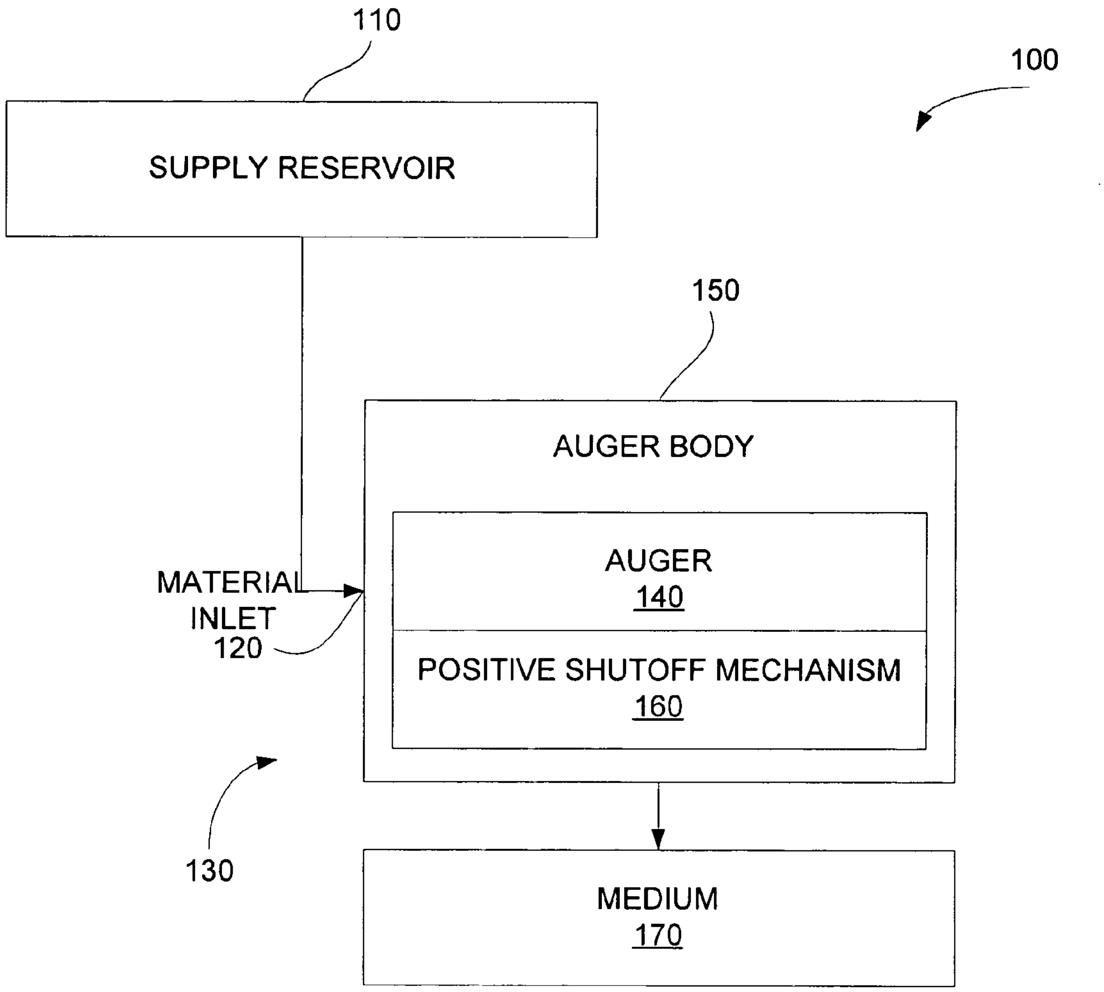
FIG. 1 is a schematic of a material dispensing system according to one exemplary embodiment.

FIG. 1 is a schematic representation of a material dispensing system (100). The material dispensing system (100) generally includes a supply reservoir (110) in communication with an auger assembly (130). As will be discussed in more detail below, the auger assembly (130) includes a positive shutoff mechanism that enables precise control of the formation of an adhesive pattern. The positive material shutoff also provides for improved flexibility in the design of the upstream delivery system. Further, the auger assembly (130) is configured to be readily replaced as an entire unit, thereby providing for replacement of the entire wetted path of the material dispensing system (100).

The supply reservoir (110) is configured to contain a material supply. The material to be contained may include a single component structural adhesive, or it may be one component of a multi-component structural adhesive supplied by multiple supply reservoirs. The supply reservoir (110) may be selectively pressurized. Pressurizing the supply reservoir (110) forces the material contained therein through the material inlet (120) and into the auger assembly (130).

The material is conveyed from the supply reservoir (110) through a material inlet (120) defined in the auger assembly (130). The auger assembly (130) further includes an auger (140) disposed within an auger body (150). The gap between the auger (140) and the auger body (150) is sufficiently small that rotation of the auger (140) drives material forward from the proximal to the distal end of the auger assembly (130). Control of the introduction of the material to the auger assembly (130) and control of the rotation of the auger (140) allow the material dispensing system (100) to controllably deposit adhesive material onto a medium (170).

The auger assembly (130) also includes a positive shutoff mechanism (160) coupled to the auger (140) and contained substantially within the auger body (150). The positive shutoff mechanism (160) is able to substantially completely close the material inlet (120) with respect to the supply reservoir (110). As a result, the auger assembly (130) may be physically isolated from the supply reservoir (110) when the positive shutoff mechanism (160) is engaged. Further, since the positive shutoff mechanism (160) is contained within the auger body (150), the positive shutoff mechanism (160) is downstream from the supply reservoir (110). As a result, the material volume that resides downstream from the supply reservoir (110) is minimized. Minimizing the amount of volume residing down stream from the supply reservoir (110) helps to minimize the flow variability of the auger assembly (130) due to compressibility effects of the adhesive material.

As discussed, the positive shutoff mechanism (160) is coupled to the auger (140) and is located within the auger body (150). Engagement of the positive shutoff mechanism (160) places the shutoff mechanism (160) into physical contact with the material inlet (120) such that the positive shutoff mechanism (160) physically covers arid closes the material inlet (120). This physical contact substantially isolates the auger assembly (130) from the supply reservoir (110). As a result, once the positive shutoff mechanism (160) is engaged, no more material enters the auger assembly (130).

Consequently, the selective engagement of the positive shutoff mechanism (160) alone may be sufficient to control material flow from the supply reservoir (110) to the auger assembly (130). As a result, the supply reservoir (110) may be held at a constant pressure because pressure variations in the supply reservoir (110) are not used to control the material flow when the system is not dispensing material. The ability to maintain the supply reservoir (110) at constant pressure enhances the precision with which the system can deliver material by minimizing pressure variations during startup. Material that remains trapped in the auger assembly (130) while the positive shutoff mechanism (160) is engaged, is prevented from drooling out onto the medium due to the viscosity of the material and not due to pressure. More specifically, the positive shutoff mechanism (160) seals the proximal end of the auger assembly (130). As a result, material contained within the proximal end of the auger assembly (130) is less likely to flow. This fluid tension of the fluid in the auger assembly (130) prevents the material from leaking or drooling out.

In addition, because the positive shutoff mechanism (160) is coupled to the auger (140) and is located within the auger body (150), the positive shutoff mechanism (160) is downstream from the supply reservoir (110). As a result, a minimal volume of material is retained in the auger assembly (130) once the positive shutoff mechanism (160) has been engaged. Because a minimal amount of material is trapped downstream and because pressure in the supply reservoir (110) is isolated from the auger assembly (130), the viscosity of the material in the auger assembly (130) prevents the material from drooling or leaking out.

The positive shutoff mechanism (160) maybe included as part of a disposable auger assembly (130-1; FIG. 2). The use of a disposable material path simplifies servicing and maintenance of the material dispensing system (100). As a replaceable auger assembly wears, becomes damaged, or clogged with cured material, the assembly can be replaced with a new assembly without requiring separate parts to be removed and/or cleaned.

Exemplary Implementation and Operation

Figure 2A:
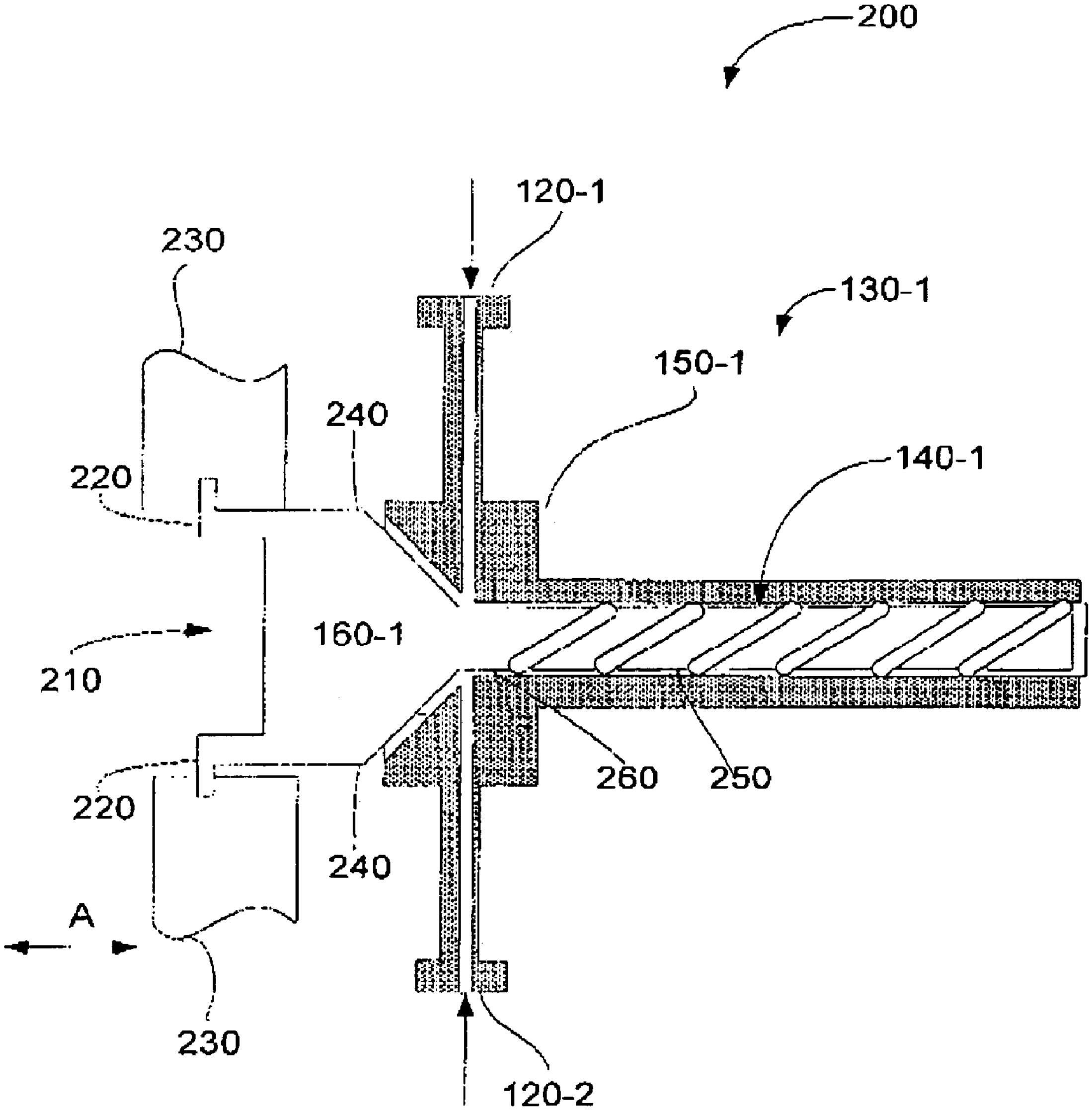
FIG. 2A illustrates a cross sectional view of an auger system with a positive shutoff mechanism in the disengaged according to one exemplary embodiment.
Figure 2B:
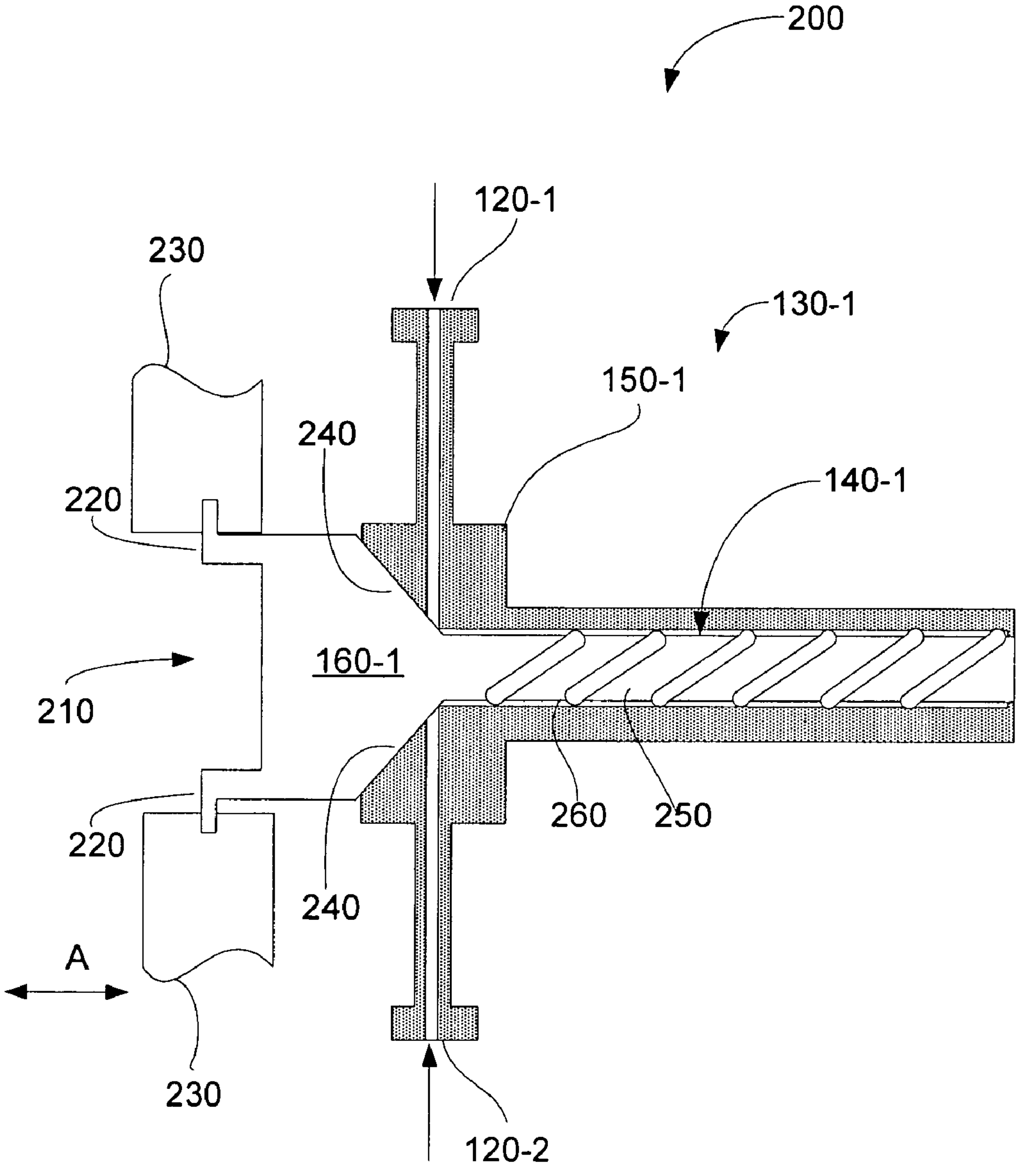
FIG. 2B illustrates a cross sectional view of an auger system with a positive shutoff mechanism engaged according to one exemplary embodiment.

FIGS. 2A-2B illustrate a material dispensing system (200) having a replaceable auger assembly (130-1). The auger assembly (130-1) also includes a positive shutoff mechanism (160-1) integral to the auger (140-1) and contained substantially within the auger body (150-1). FIG. 2A illustrates the positive shutoff mechanism (160-1) disengaged and FIG. 2B illustrates the positive shutoff mechanism (160-1) engaged.

Starting at the proximal end, the auger (140-1) includes a drive engaging member (210), flanges (220), a positive shutoff mechanism (160-1), a shaft (250) and a helical member (260) wound about the shaft (250). The drive engaging member (210) has an interface for coupling to a drive member. For example, the drive engaging member (210) may have a recessed shape corresponding to the shape of a complimentary drive member. Such a configuration allows the auger assembly (130-1) to be removably coupled to the material dispensing system (200).

The auger (130-1) also includes flanges (220) disposed on its proximal end. The flanges (220) are coupled to an axial translation assembly (230). As will be discussed in more detail below, an axial translation assembly (230) moves the positive shutoff mechanism (160-1) between an engaged and a non-engaged position.

The positive shutoff mechanism (160-1) includes sealing shoulder portions (240). The axial translation assembly (230) moves the auger (140-1) in an axial direction (A) with respect to the auger body (150-1). The axial translation causes the sealing shoulder portions (240) to move between closed and open positions with respect to first and second material inlets (120-1, 120-2) which are part of the fixed auger body (150-1). While the sealing shoulder portions (240) are in the closed position, they are in positive, physical contact with the faces of the material inlets (120-1, 120-2). This physical contact isolates the auger assembly (130-1) from the supply reservoir. When the sealing shoulder portions (240) are in the open position, there is a gap between them and the material inlets (120-1, 120-2). The gaps provide a path by which the material enters the auger assembly (130-1).

Engagement of the positive shutoff mechanism (160-1) prevents material from being delivered to the auger assembly (130-1) and hence the auger (140-1). As discussed, the interaction of the sealing shoulder portions (240) with the material inlets (120-1, 120-2) alone may be sufficient to control material flow from the supply reservoir to the auger assembly (130-1). As a result, the supply reservoir (110; FIG. 1) may be held at a constant pressure which enhances the precision with which the system can dispense material onto a medium. In addition, the positive shutoff mechanism (160-1) minimizes the amount of material that leaks out or is drooled from the auger assembly (130-1) onto a medium.

The material dispensing system (200) illustrated in FIG. 2 includes first and second material inlets (120-1, 120-2). The material inlets (120-1, 120-2) introduce a plurality of adhesive components to the auger assembly (130-1). As discussed, when the positive shutoff mechanism (160-1) is opened, material enters the auger assembly (130-1).

The adhesive components are mixed in the auger assembly (130-1). As the auger (140-1) rotates, the helical member (260) drives the material around the shaft (250) toward the distal end of the auger assembly (130-1). After the adhesive reaches the distal end of the auger assembly (130-1), the adhesive is dispensed. During normal operation, a medium is moved into position with respect to the material dispensing system (200). The material dispensing system (200) then deposits the adhesive onto the medium. Dispensing operations are paused as another medium is moved into position with respect to the material dispensing system (200).

As the mixed adhesive sits in the auger assembly (130-1), the adhesive begins to set up or cure. Consequently, hardened adhesive tends to build up in the auger assembly (130-1). Over time, this build up may interfere with the proper operation of the dispensing system (200) to such an extent that the auger assembly (130-1) must be replaced. Other factors, such as wear or damage may also require replacement of the auger assembly (130-1).

In such an event, the entire auger assembly (130-1), including the positive shutoff mechanism (160-1) may be replaced as a single unit. To replace the auger assembly (130-1), the material inlets (120-1, 120-2) are uncoupled from the supply reservoirs, the drive or gear engaging member (210) is uncoupled from the drive member, and the flanges (220) are uncoupled from the axial translation assembly (230). As a result, the entire wetted path of the system may be readily replaced as a single disposable unit. Such a replaceable auger assembly (130-1) is part of a cost effective material dispensing system (200) that dispenses a precise amount of material during dispensing operations while preventing uncontrolled drooling.

Figure 3:
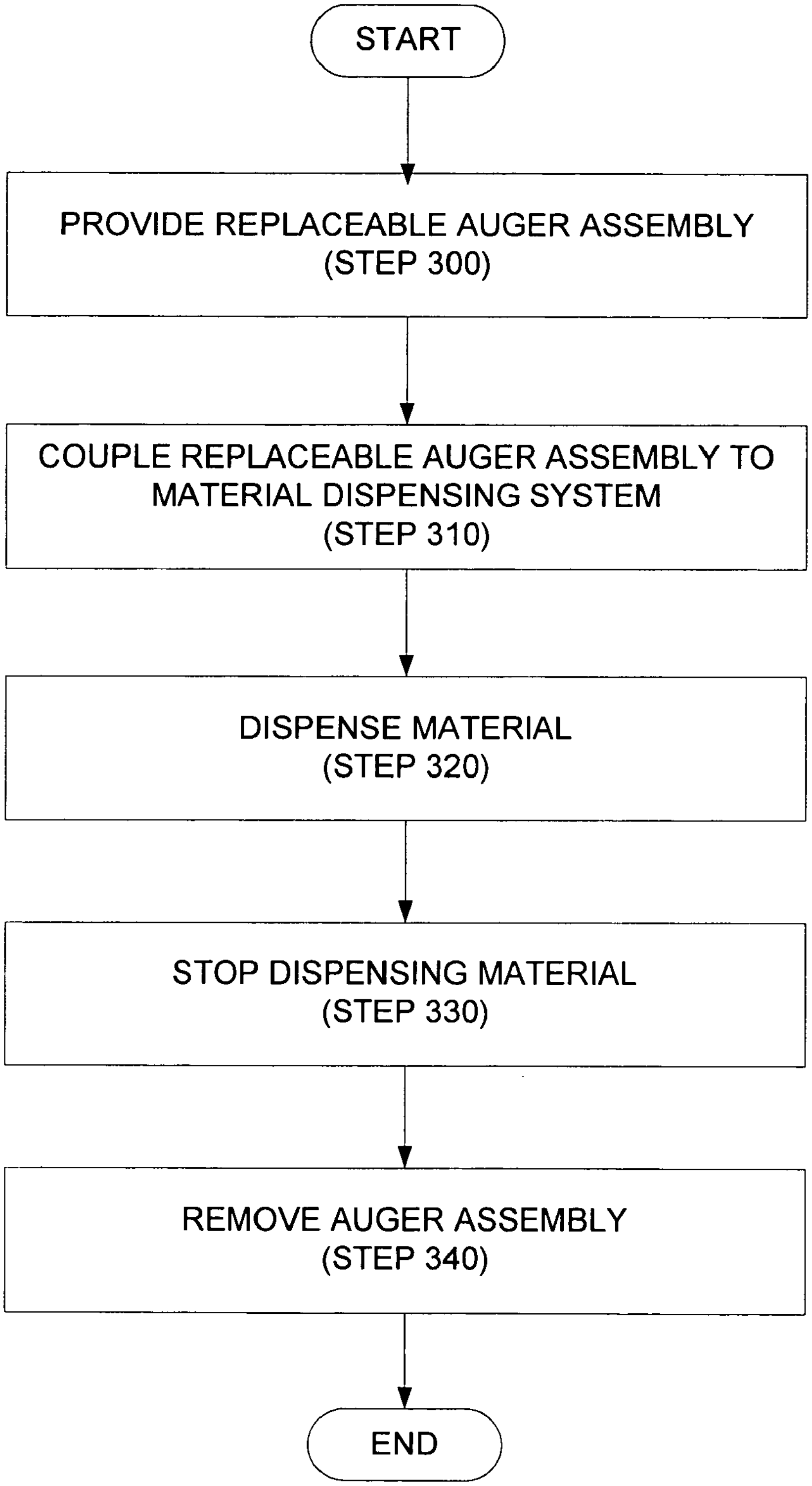
FIG. 3 illustrates a method of using a material dispensing system according to one exemplary embodiment.

FIG. 3 is a flowchart illustrating a method of using a material dispensing system. The method begins by providing a replaceable auger assembly (step 300). The replaceable auger assembly includes many of the wetted path components of the material dispensing system. These wetted path components include a material inlet(s), an auger disposed within an auger body, and a positive shutoff mechanism coupled to the auger.

The replaceable auger assembly is then coupled to the material dispensing system (step 310). The material dispensing system includes a rotating member, such as a motor shaft, coupled to the auger. As a result, rotation of the rotating member causes the auger to rotate with respect to the auger body. The material dispensing system also includes at least one supply reservoir. Each supply reservoir is coupled to a corresponding material inlet. When the auger assembly is coupled to the material dispensing system, the positive shutoff mechanism is coupled to the material dispensing system as well. Engagement of the positive shutoff mechanism places the shutoff mechanism in physical contact with the material inlet(s). This physical contact isolates the auger assembly from the supply reservoir.

With the replaceable auger assembly in place, the fluid dispensing system is set up to dispense material. The material dispensing system then selectively dispenses a predetermined amount of material (step 320). In order to dispense the material, the auger is rotated with respect to the auger body and the positive shutoff mechanism is disengaged. During normal operation, the auger may rotate at approximately 120 to 180 revolutions per minute to dispense approximately 10 micro-liters of material per second. The auger continues to rotate until a predetermined amount of material has been dispensed.

Once the predetermined amount of material has been dispensed, the dispensing operation is paused (step 330). Accordingly, rotation of the auger is stopped and the positive shutoff mechanism is engaged. In some embodiments, engagement of the positive shutoff mechanism, as shown in FIG. 2, involves moving the sealing shoulder portions of the shutoff mechanism into contact with the material inlets. As will be discussed with reference to FIG. 5, engagement of the positive shutoff mechanism may involve rotating a cammed lobe into physical contact with the material inlets.

The adhesive components tat are dispensed from the material dispensing assembly are mixed in the auger assembly. As the mixed adhesive sits in the auger assembly, the adhesive begins to set up. The hardened adhesive that tends to build up in the auger assembly may accumulate to the extent tat it prevents proper operation of the material dispensing system. At this point, it must be determined if the auger assembly should be removed (step 340). If the dispense operation is complete, or the auger assembly has been clogged, the auger assembly should be removed (step 340). If the dispensing operation has paused but is incomplete and the auger assembly operational, the dispensing operation may be resumed (step 320).

If the dispensing operation is complete and/or the auger assembly is clogged, the auger assembly may be removed (step 350). Other factors, such as wear or damage may also require replacement of the auger assembly. Such a replaceable auger assembly is part of a cost effective material dispensing system that dispenses a precise amount of material during dispensing operations while preventing uncontrolled drooling.

Figure 4:
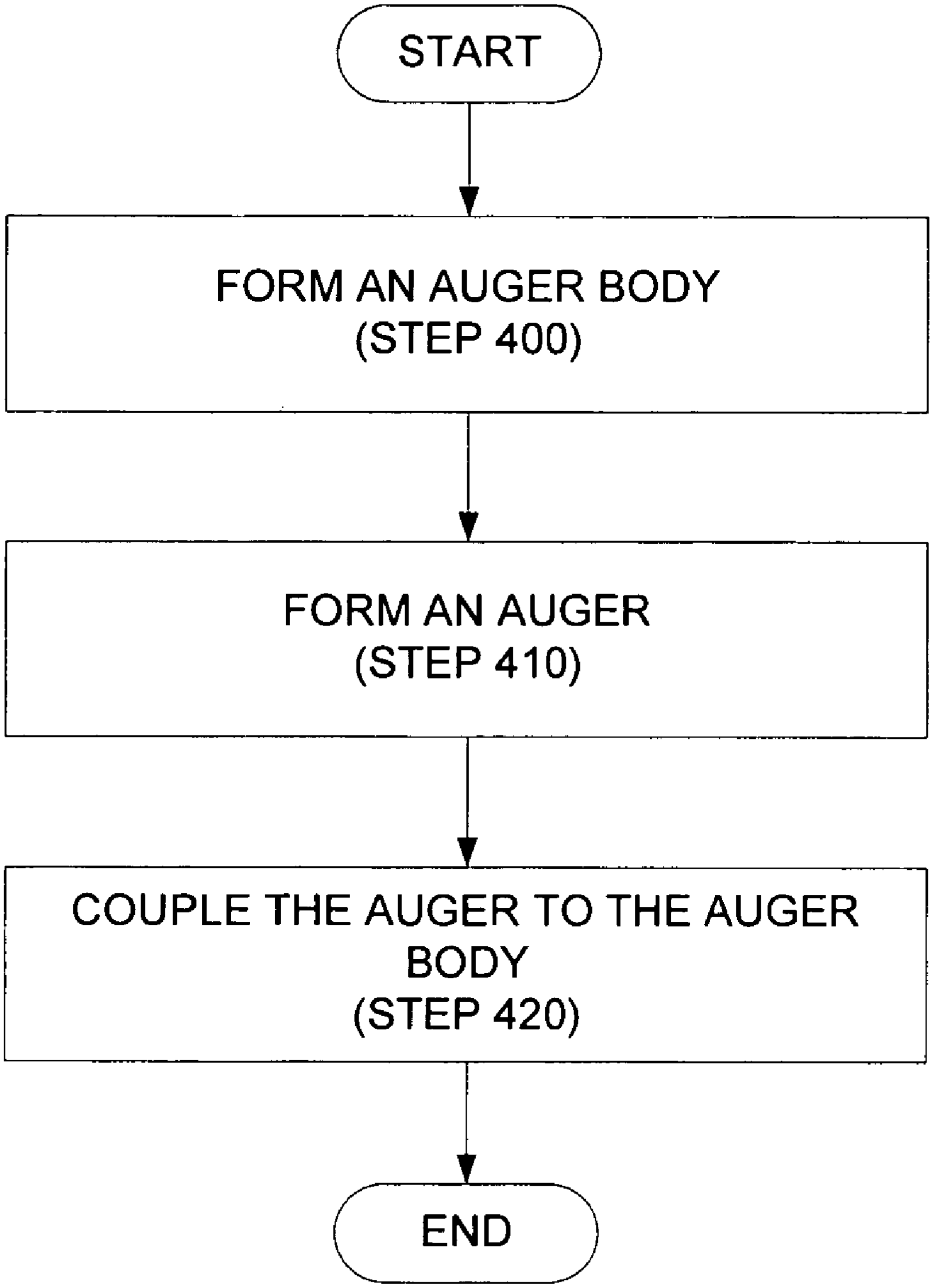
FIG. 4 illustrates a method of forming an auger assembly according to one exemplary embodiment.

FIG. 4 illustrates a method of forming an auger assembly. The method begins by forming an auger body (step 400). The auger body includes at least one material inlet configured to communicate with a corresponding supply reservoir. The auger body may include multiple material inlets corresponding to multiply supply reservoirs. The auger body is also configured to have an auger coupled thereto.

Accordingly, the next step is to form an auger having a positive shutoff mechanism coupled thereto (step 410). The auger includes a helical member disposed about the shaft. The configuration of the auger causes it to act as an Archimedean screw, which forces the material from the proximal to the distal end of the auger assembly as the auger is rotated within the auger body.

The auger also includes a drive engaging member that has a negative shape defined therein corresponding to the shape of a complimentary drive member. The drive engaging member allows the auger assembly to be removably coupled to the rest of the material dispensing system.

The auger also has a positive shutoff mechanism. Accordingly, the next step is to form a positive shutoff mechanism on the auger (step 420). The positive shutoff mechanism is configured to selectively prevent material from being delivered to the auger assembly. The positive shutoff mechanism illustrated in FIG. 2 includes sealing shoulder portions that are moved in an axial direction between non-contact and sealing contact with the material inlets. The positive shutoff mechanism illustrated in FIG. 5 includes a cammed lobe formed on the shaft of the auger that rotates between sealing contact and non-contact with respect to a corresponding number of material inlets. In either case, when the positive shutoff mechanism closes the material inlet, the auger assembly is isolated from the supply reservoir. As a result, the supply reservoir may be held at a constant pressure which enhances the precision with which the system can dispense material onto a medium.

The auger is then coupled to the auger body (step 420). To couple the auger to the auger body, the auger may be placed at least partially within the auger body such that the shaft and the helical member are contained within the auger body. In addition, the positive shutoff mechanism is positioned such that it may be moved into selective engagement with corresponding material inlets formed in the auger body. Accordingly, an auger assembly according to the present method is configured to be replaceably coupled to a material dispensing system.

A replaceable auger assembly having a positive shutoff mechanism improves the controllability of material dispensing operations by minimizing the amount of pressure and flow variations in the system. Once the auger assembly has surpassed its useful life, the entire assembly may be replaced. As discussed, an inexpensive positive shutoff mechanism may be provided as part of the auger assembly. This mechanism may be replaced when the auger assembly has surpassed its useful life. Accordingly, the positive shutoff mechanism does not need to be separately cleaned or maintained. This increased simplicity may in turn reduce the time necessary to maintain and service the material dispensing system.

Alternative Embodiments

Figure 5A:
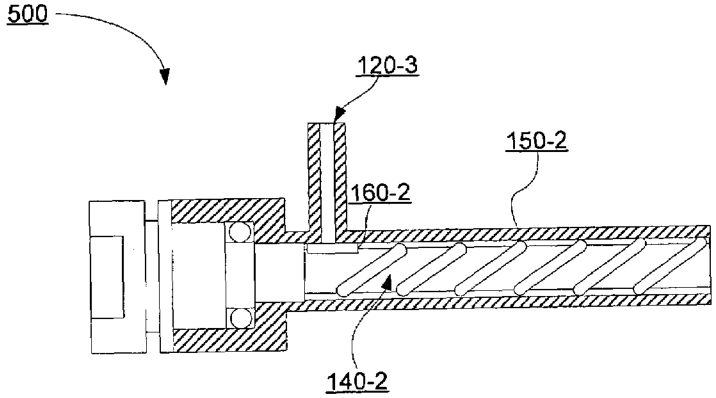
FIG. 5A illustrates an auger assembly according to one exemplary embodiment.
Figure 5B:
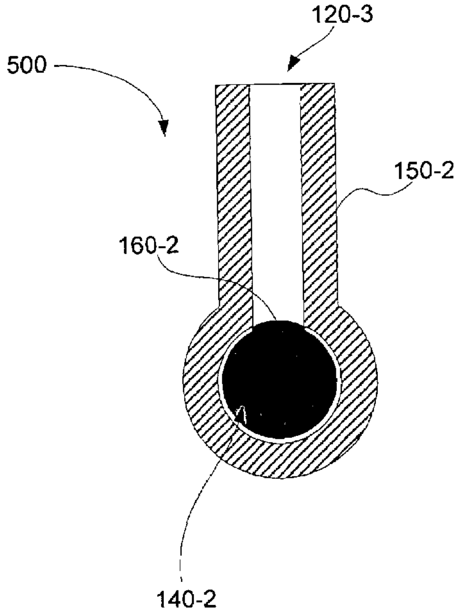
FIG. 5B illustrates a top view of the auger assembly of FIG. 5A of the auger system with the positive shutoff mechanism engaged.
Figure 5C:
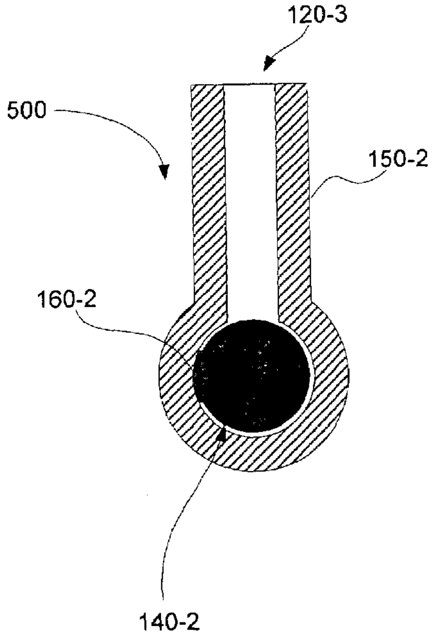
FIG. 5C illustrates a top view of the auger assembly of FIG. 5A of the auger system with the positive shutoff mechanism disengaged.

FIGS. 5A-5C illustrate an alternative auger assembly (500). The auger assembly (500) is coupled to a supply reservoir by way of a single material inlet (120-3). The auger assembly (500) includes an auger (140-2) having a positive shutoff mechanism (160-2). The auger (140-2) is disposed within an auger body (150-2). The illustrated positive shutoff mechanism (160-2) includes a cammed lobe.

As the auger (140-2) rotates, the positive shutoff mechanism (160-2) rotates about an axis between engaged and non-engaged positions. In the engaged position, the positive shutoff mechanism (160-2) completely covers the material inlet (120-3). As a result, while the positive shutoff mechanism (160-2) is in the engaged position, it isolates the auger assembly (500) from a supply reservoir.

To place the positive shutoff mechanism (160-2) in the closed position, information about the rotation of the auger (140-2) is communicated to an external controller. The controller is configured to control the rotation of the positive shutoff mechanism (160-2) with respect to the material inlet (120-3). When the controller receives a command to engage the positive shutoff mechanism (160-2), the controller rotates the positive shutoff mechanism (160-2) into a position covering the material inlet (120-3).

During a dispensing operation, the controller directs the auger (140-2) to rotate at a substantially continuous rate. When dispensing operations are to be paused or stopped, the controller causes the auger (140-2) to stop rotating such that the positive shutoff mechanism (160-2) covers the material inlet (120-3) as discussed above.

Figure 6:
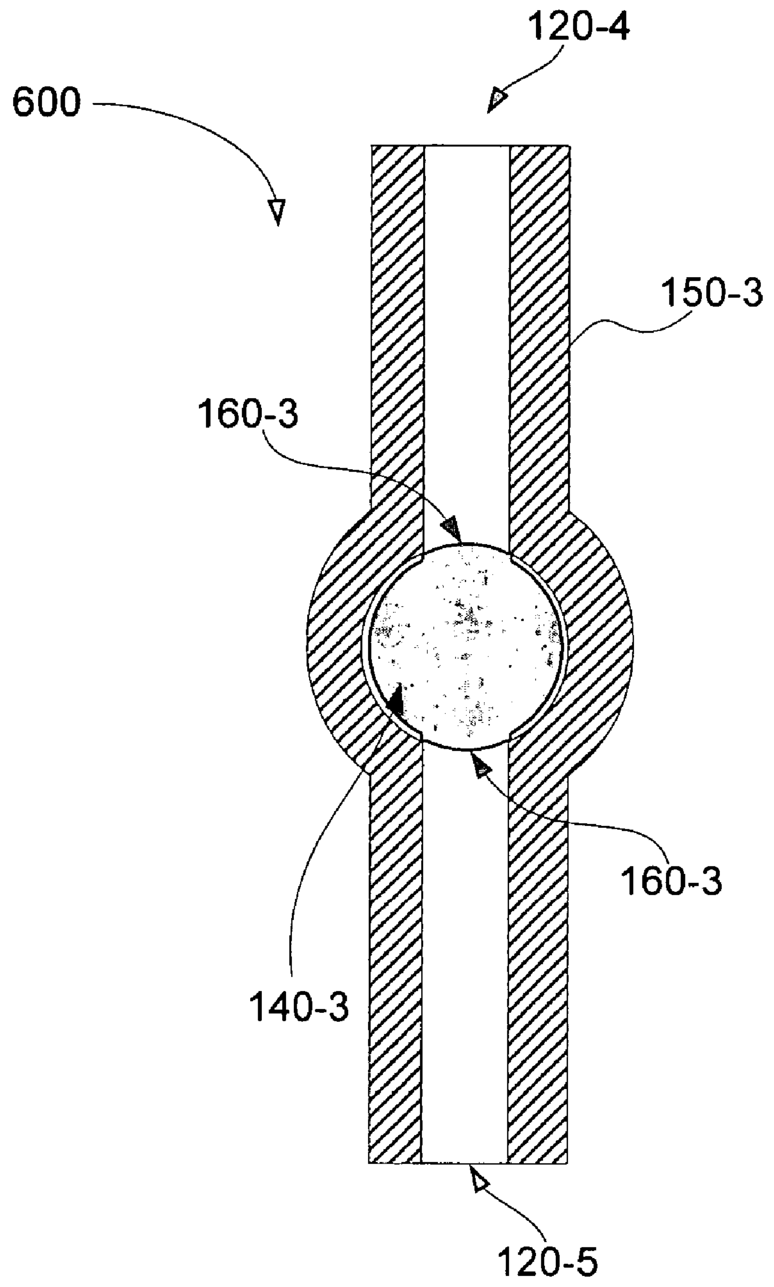
FIG. 6 illustrates a top view of an auger assembly according to one exemplary embodiment.

FIG. 6 illustrates an auger assembly (600) having a positive shutoff mechanism (160-3) that includes a plurality of cammed lobes (610) configured to engage a corresponding number of material inlets (120-4,120-5) defined in the auger body (150-3). Similar to the auger assembly of FIG. 5, the positive shutoff mechanism (160-3) may be coupled to a controller that is configured to control the rotation of the auger (140-3). This rotation causes the cammed lobes to move between contact and non-contact with the material inlets (120-4,120-5), contact meaning that the lobe seals the inlet and non-contact meaning that the lobe is displaced from the inlet allowing material to flow through the inlet..

Figure 7:
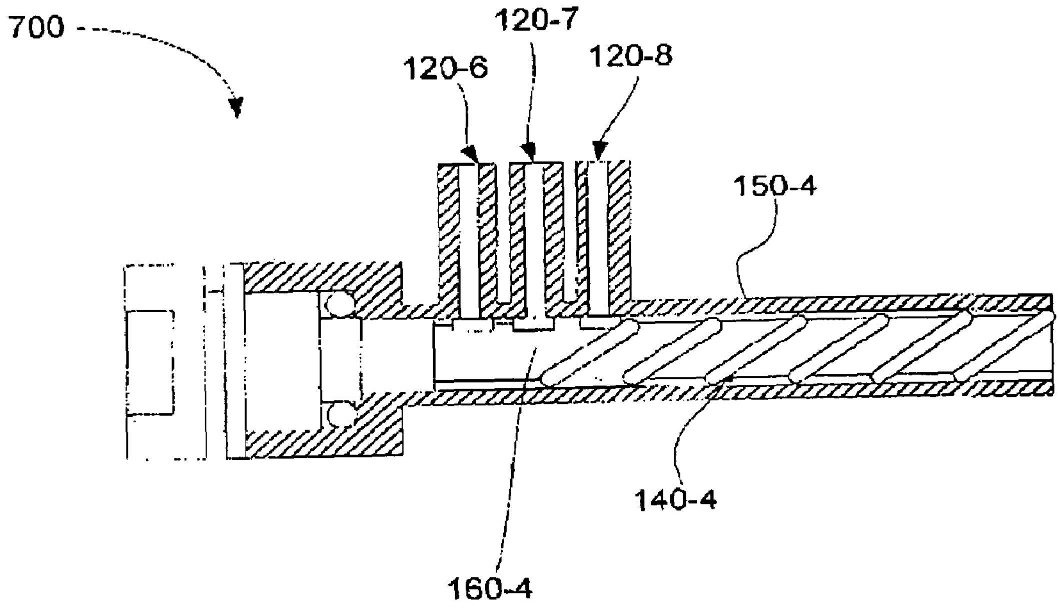
FIG. 7 illustrates a cross sectional view of an auger assembly according to one exemplary embodiment.

FIG. 7 illustrates an auger assembly in which the positive shutoff mechanism (160-4) includes a plurality of cammed lobes which are spaced radially and axially in order to enable shutoff of multiple material inlets (120-6, 120-7, 120-8) defined in the auger body (150-4). Again, the auger assembly of (700) may be coupled to a controller that is configured to control the rotation of the auger (140-4). This rotation causes the cammed lobes (710) to move between contact and non-contact with the material inlets (120-4,120-5), contact meaning that the lobe seals the inlet and non-contact meaning that the lobe is displaced from the inlet allowing material to flow through the inlet.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the invention be defined by the following claims.

What is claimed is:

1. A replaceable auger assembly, comprising an auger body having at least one material inlet defined therein;

an auger disposed within said body, said anger having a helical portion disposed about an shaft portion; and a positive shutoff mechanism, said positive shutoff mechanism comprising a sealing shoulder portion formed with a conical shape on a shaft of said auger;

wherein positive shutoff mechanism is configured to selectively close said material inlet.

2. The device of claim 1, further comprising an actuator coupled to said auger, said actuator being configured to move said positive shutoff mechanism between a closed and an open position with respect to said material inlet.

3. The device of claim 2, wherein said actuator is configured to move said positive shutoff mechanism in an axial direction between said closed and said open positions.

4. The device of claim 1, wherein said auger body, auger and positive shutoff mechanism are arranged so as to be simultaneously replaceable as a single unit.

5. The device of claim 2, further comprising a drive engaging member defined in a proximal end of said auger.

6. The device of claim 1, further comprising a plurality of material inlets defined in said auger body.

7. The device of claim 1, further comprising an actuator coupled to said auger, said actuator being configured to move said positive shutoff mechanism in an axial direction between open and closed positions.

8. The device of claim 7, wherein said auger body, auger and positive shutoff mechanism are arranged so as to be simultaneously replaceable as a single unit.

9. The device of claim 7, further comprising a plurality of material inlets defined in said auger body.

10. The device of claim 9, wherein said positive shutoff mechanism stops all of said plurality of material inlets when engaged.

11. The assembly of claim 1, further comprising a supply reservoir connected to said inlet, wherein a constant pressure is applied in said supply reservoir during operation of said auger assembly.

12. A material dispensing system, comprising:

an auger assembly including an auger body, two separate material inlets in said body, an auger disposed at least partially within said body, a positive shutoff mechanism coupled to said auger that stops both of said material inlets when engaged, and a drive engaging member defined in a proximal end of said auger; and first and second supply reservoirs in respective communication with said two separate material inlets.

13. The system of claim 12, wherein said positive shutoff mechanism comprises sealing shoulder portions formed wit a conical shape on a shaft of said auger.

14. The system of claim 12, further comprising an axial translation assembly and wherein said auger further comprises a flange disposed on a proximal end of said auger and removably coupled to said axial translation assembly.

15. The system of claim 14, wherein said axial translation assembly is configured to move said positive shutoff mechanism between open and closed positions relative to said material inlets.

16. The system of claim 12, wherein said positive shutoff mechanism comprises at least one cammed lobe formed on a shaft of said auger.

17. The system of claim 16, wherein said drive member is configured to rotate said cammed lobe between open and closed positions with respect to said material inlet.

18. The system of claim 12, wherein said positive shutoff mechanism is configured to completely close said material inlets.

19. The system of claim 18, wherein said material inlets are closed by placing said positive shutoff mechanism in physical contact over said material inlet.

20. The system of claim 12, wherein said auger assembly is removably coupled to said material dispensing system.

21. The system of claim 12, wherein a constant pressure is applied in said first and second supply reservoirs during operation of said auger.

22. The system of claim 12, wherein said auger body, auger and positive shutoff mechanism are arranged so as to be simultaneously replaceable as a single unit.

23. The system of claim 12, wherein said first and second supply reservoirs comprise respective components of an adhesive that are mixed by said auger after passing into said auger body.

24. The system of claim 12, wherein materials from said first and second supply reservoirs are mixed by said auger after passing into said auger body.

* * * * *

UNITED STATES PATENT AND TRADEMARK OFFICE

CERTIFICATE OF CORRECTION

PATENT NO. : 7,316,335 B2
APPLICATION NO. : 10/754404
DATED : January 8, 2008
INVENTOR(S) : William S. Colburn et al.

It is certified that error appears in the above-identified patent and that said Letters Patent is hereby corrected as shown below:

In column 3, line 37, delete “arid” and insert -- and --, therefor.

In column 6, line 15, delete “tat” and insert -- that --, therefor.

In column 6, line 20, delete “tat” and insert -- that --, therefor.

In column 8, line 27, in Claim 1, delete “anger” and insert -- auger --, therefor.

In column 9, line 8, in Claim 13, delete “wit” and insert -- with --, therefor.

Signed and Sealed this

Twenty-fourth Day of June, 2008

JON W. DUDAS
*Director of the United States Patent and Trademark Office*